Oct. 25, 1966 R. L. McALEXANDER ET AL 3,281,079
TRANSPIRATION COOLING SYSTEM ACTUATING A LIQUIFIED
METAL BY PRESSURIZED GAS
Filed Sept. 21, 1964
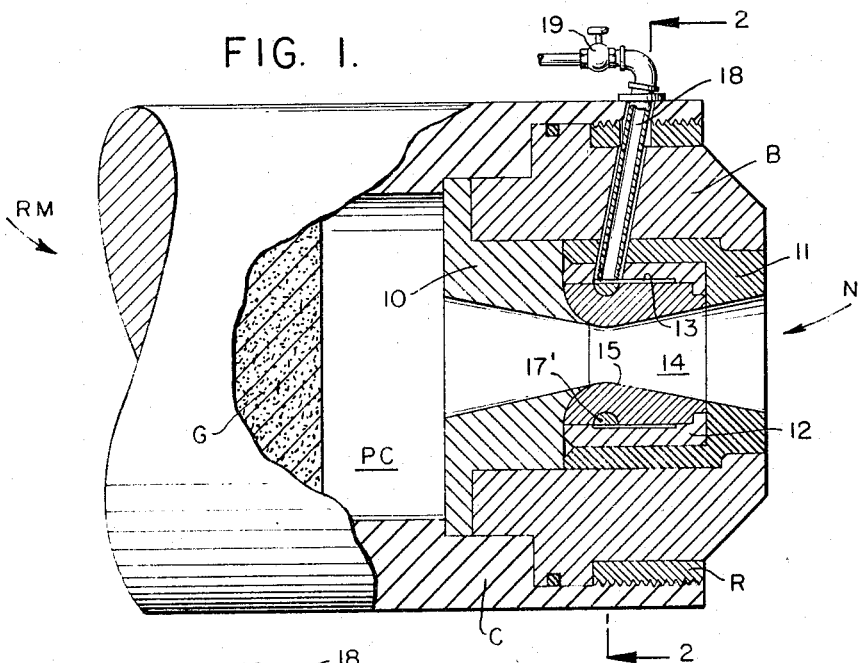
FIG. 1.
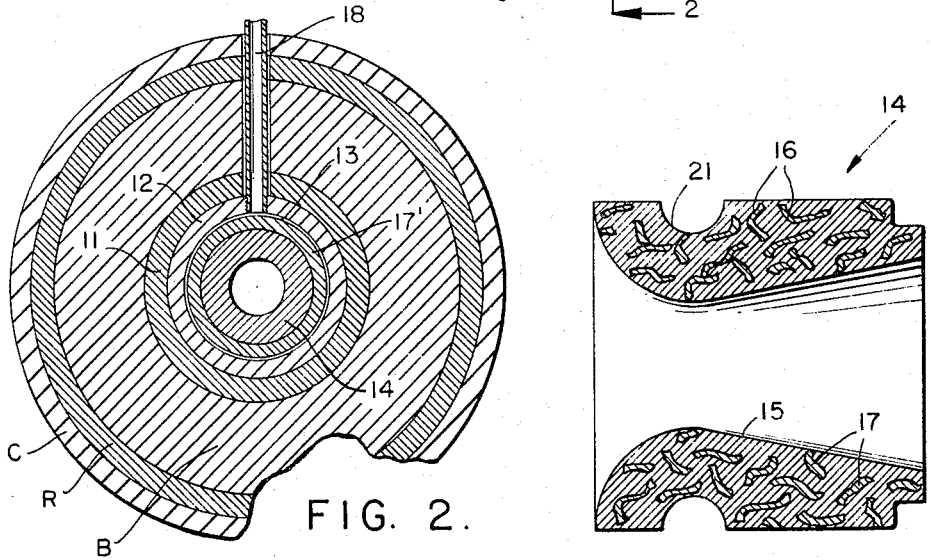
FIG. 2.
FIG. 3.
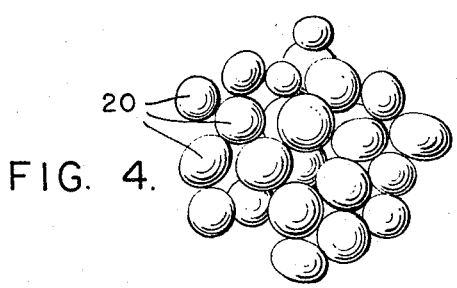
FIG. 4.
INVENTORS.
ROBERT L. McALEXANDER
ALLEN T. ROBINSON
BY
*P. H. Fishk*
ATTORNEY.

3,281,079
TRANSPIRATION COOLING SYSTEM ACTUATING A LIQUEFIED METAL BY PRESSURIZED GAS
Robert L. McAlexander, Fredericksburg, Va., and Allen T. Robinson, China Lake, Calif., assignors to the United States of America as represented by the Secretary of the Navy
Filed Sept. 21, 1964, Ser. No. 398,485
8 Claims. (Cl. 239—127.3)

The invention described herein may be manufactured and used by or for the Government of the United States of America for governmental purposes without the payment of any royalties thereon or therefor.

The present invention relates to improvements in systems for arresting and controlling high temperatures in structural members and more particularly to cooling systems for rocket motor exhaust nozzles.

Those engaged in the design and development of rocket motors are continuously searching for means which will satisfy design requirements arising as a result of an extended use of high energy propellants in missile systems. A shift in use to rocket motors having longer firing times, and propellants having a higher specific impulse, has resulted in a necessity to pursue vigorous material development programs. Many of these programs have been directed to providing satisfactory solutions to the problem of containing gases at abnormally high temperatures and pressures over extended periods of rocket motor firing time.

Much attention has been directed to providing means for cooling the throat of convergent-divergent rocket motor exhaust nozzles, as it has been found that when exotic fuels are burned in a rocket motor the surfaces of that throat of the motor's exhaust nozzle tend to erode at an accelerated rate and thereby reduce the efficiency of the rocket motor.

Various schemes have been proposed for cooling the effective surfaces of rocket motor exhaust nozzles. Such schemes often include the use of liquids and gases as transpiration cooling mediums. The mediums pass, in a relatively cool state, from the interior of the nozzle element or structure through suitable pores and, by gross addition to the boundary layer, provide a cooling effect along the surfaces of the hot wall through a dilution of the existing hot gases. However, known transpiration mediums such as water, gas, and other coolants do not satisfy existing needs as their use is severely limited, since prohibitive weights and volumes of coolant, large storage facilities, and complex pumping systems are normally required. Furthermore, such systems simply do not in practice eliminate surface erosion. It is potsulated that this results from the fact that when known transpiration mediums are utilized, controlled flow is necessarily unobtainable, since regional temperature gradients appear along the surfaces permitting deposits of exhaust gas solids to occur along the nozzle wall, which serve to obstruct the flow of transpiration mediums through the pores of nozzle structure to the hot surfaces thereof.

Other attempts have been made to cool nozzle surfaces through the utilization of systems including mediums comprising a solid or a liquid medium imbedded or impregnated in the nozzle structure. However, in such systems it has been found that coolant flow through the nozzle structure is insignificant. In the absence of a substantial flow of coolant, through the pores of the nozzle structure, the liquid/gas or solid/gas interface recedes inwardly into the nozzle structure, whereby the cooling of the surface of the hot wall, produced through change in phase of the medium, is minimized. This is particularly undesirable, since the surface will tend to heat and erode for thus causing changes in effective throat area to occur. Also, in such systems, the motor's firing time must necessarily be of a relatively short duration. This results from the fact that when known systems are utilized it is not feasible to imbed a sufficient quantity of the medium within the nozzle structure to provide for an extended motor firing period. Furthermore, when utilizing known impregnated nozzle structures, there exists a lack of selectivity in temperature control, since the medium inherently sublimes or evaporates at a rate fixed by the characteristics of the material, the exhaust gas pressure, and the temperature of the inner nozzle structure.

Therefore, it is the purpose of the instant invention to provide a nozzle throat cooling system which overcomes the aforementioned disadvantages, while embracing the advantages, of the aforementioned devices and systems. To attain this, the present invention contemplates a unique method and system wherein an impregnated, solid transpiration medium or material, having relatively high melting and vaporization points, is changed to a liquid within the nozzle structure, then supplied to, or effused, and evaporated at the surfaces of a nozzle throat in a process extended over a relatively long period of time and in a controlled manner to effect a cooling of the surface as the medium is caused to vaporize.

An object of the instant invention is to provide a cooling system for structual members.

Another object is to provide a simple and economic method and system for cooling the throat of a motor rocket exhaust nozzle.

A further object is to provide a system for arresting and controlling the heating of a structural member normally subjected to intense heat.

A further object is to provide a reliable and light-weight system for arresting and controlling the heating and erosion normally occurring within the throat of a rocket motor exhaust nozzle as the motor is operated over an extended period of time.

And yet a further object is to provide a transpiration cooling system for a structural member wherein a solid coolant is first liquefied and then forced from the interior of the member and effused at a heated surface, in a controlled manner, for cooling the structural member as the coolant is subsequently caused to vaporize in response to applied heat.

Other objects, advantages and novel features of the invention will become apparent from the following detailed description of the inevntion when considered in conjunction with the accompanying drawings wherein:

FIG. 1 is a partial cross-sectional view of an exhaust section of a rocket motor illustrating the relationship of the throat liner relative to various components for the system of the instant invention;

FIG. 2 is a cross-sectional view ofthe nozzle assembly taken generally along lines 2—2 of FIG. 1;

FIG. 3 is a longitudinal cross-sectional view, on an enlarged scale, of the throat liner of FIGS. 1 and 2, illustrating its porous construction; and FIG. 4 illustrates a microscopic view of a modification of matrix structure as may be provided for in the present invention.

Referring now to the drawings, wherein like reference characters designate like or corresponding parts throughout the several views, there is shown in FIG. 1 a rocket motor, generally designated RM, within which there is mounted a solid propellant grain G. The grain G is fixed within the motor RM in any suitable manner and is so arranged as to provide a pressure chamber PC just ahead of the motor's convergent-divergent exhaust nozzle section, generally designated N, which includes an annular convergent member 10 and an annular divergent member 11 arranged in mutually abutting relationship. The nozzle section N is fitted into the rocket motor's case C and secured therein by any suitable means, such as, for example, a threaded retainer ring R and a mounting block B.

The annular divergent member 11 is relieved adjacent to the throat area of the nozzle so as to slidingly receive a cylindrical liner retainer 12. The interior midportion of the wall of the container 12 is machined, or otherwise relieved, to provide an annular cavity or chamber 13. Mounted within the retainer 12 is a cylindrical nozzle throat liner 14, which is normally sealed within the retainer 12 and serves to constrict the stream of exhaust gases generated as the grain G is caused to burn for providing a propelling thrust to the motor RM.

The interior or gas-directing surfaces 15 of the liner 14 are so aligned with the gas-directing surfaces of the convergent nozzle member 10, and the gas directing surfaces of the divergent nozzle member 11, as to provide a continuous gas-directing surface through the nozzle section N, whereby the stream of gases passing from the chamber PC may be constricted in a preselected manner so as to maintain the pressure of chamber PC at a predetermined level. Hence, it is to be understood that the internal surface 15, of the liner 14, serves to establish the effective throat area for the nozzle section N.

The liner 14, in effect, comprises a structural member having an internal network of passageways for establishing a plurality of random interstices 16 extending throughout the liner and communicating with the external surfaces thereof. These interstices are infiltrated with a preselected liquid transpiration medium 17, which subsequently solidifies within the interstices to provide a matrix in the form of an impregnated liner 14, FIG. 3.

In practice, the matrix may be formed of various materials, as dictated by certain design parameters, such as, for example, the pressures and temperatures to which the liner will in operation be subjected. However, it is presently preferred that the matrix be formed of porous tungsten, graphite or any other suitable refractory material, FIG. 3, which is first infiltrated then machined into a liner configuration. Porous tungsten and graphite are the most feasible materials, at present, which fulfill the strength and temperature requirements.

The transpiration medium 17 must necessarily possess lower boiling and melting points than the material from which the matrix is formed, however, the medium also must be of a material which may be caused to melt within the structure and flow as a liquid, under pressure, and effuse as a liquid at the surface 15 so that the interface will not recede as the medium undergoes a phase change. In practice, metals such as copper, silver, zinc and magnesium, for example, have appeared to meet the present requirements for existing rocket motors, but it is contemplated that numerous materials may be provided, as dictated by the liner's intended operative environment. In any event, it is necessary that the transpiration medium 17 be capable of being melted and subsequently vaporized at the surface 15 by the heat transferred thereto from the exhaust gases generated as the propellant is burned.

In order for the system to perform its cooling function, as intended, it is necessary that the transpiration medium 17 be first liquefied and then vaporized at the surface 15 of the liner 14. Consequently, it is necessary to provide means for forcing the medium, in a heated and liquefield state, from the interstices 16 to the surface 15. This is effected by means of a fluid pressure conduit 18, which serves to connect the chamber or cavity 13 with a source of pressurized fluid (not shown). The pressurized fluid may comprise a liquid or gas as desired, however, it is deemed preferable to utilize an inert gas such as argon, for example. Another possibility is to utilize the high pressure gas from the rocket motor to provide the necessary pressure.

The chamber 13 is sealed by the liner 14 and forms a plenum chamber so that the pressurized fluid may act against the transpiration medium 17. As the medium 17 will be liquefied upon being heated by the exhaust gases, it may be forced by the pressurized fluid, from the pores or interstices 16, and effused at surface 15 where it is vaporized.

The quantity of the medium 17 ultimately effused at the surface 15, at any given time and for a given liner porosity, is dictated by the size and shape of the pores, the viscosity of the medium and the pressure established within the chamber or cavity 13. Therefore, an operable valve 19, of suitable and conventional design, is provided between the cavity 13 and the source of pressurized fluid. Thus, the pressure established within the cavity 13 may be selectively controlled through a manipulation of the valve 19. This selectivity in control of the established pressures is of primary importance where the motor RM is to be operated at high pressures over an extended period of time, since the viscosity of the medium 17 normally tends to decrease as the liner 14 is subjected to continued heating.

In order to provide for increased control over the rate at which the medium 17 is effused at the surface 15, the matrix may be formed of closely packed microscopic spheres 20, as illustrated in FIG. 4. This matrix structure has been utilized for imparting greater uniformity to the interstices thus affording greater control over medium transpiration. However, when microscopic spheres are utilized structural strength is sacrificed. Therefore, alternate techniques may be employed to provide a matrix of a selected material having uniform capillary tubes or pores, formed by various means suitable for forming uniform pores in the selected material. Of course, any technique utilized must provide a matrix having uniformly distributed pores, which establish a communication between the chamber 13 and the surface 15 in a substantially uniform manner, so that the transpiration medium may be forced through the pores and effused at the surface 15 in a uniform and controlled manner.

In most instances, to provide a sufficient quantity of transpiration medium within the interstices has not been found practical where the motor RM is to be operated over an extended firing time. Therefore, an additional quantity of transpiration medium 17', FIG. 1, having predetermined liquefication and vaporization characteristics is deposited in a circumferential groove 21 formed in the liner 14 and opening into the cavity 13. Hence, the medium 17', upon liquefying, may be forced from the groove 21 and into the interstices 16 to be dispersed throughout the structure of the liner 14 and subsequently effused through surface 15 under the influence of the pressurized fluid acting thereon, and vaporized under the influence of heated exhaust gases.

In operation, the grain G is burned for thus generating exhaust gases which subsequently exhaust or pass through the nozzle section N. These gases tend to transfer heat to the liner 14 and thereby cause the solid transpiration medium 17, contained in the interstices 16, to liquefy, whereupon a secondary cooling of the liner 14 is caused to occur. Assuming that a sufficient pressure is established in the cavity or chamber 13, the liquefied transpiration medium is now forced toward the throat of the nozzle section and effused at surface 15. As the transpiration medium is effused at the surface 15 it is vaporized under the influence of heat transferred thereto from the exhaust gases. Vaporization of the medium 17 serves to impose a primary cooling effect on the liner 14 and at the surface thereof. Continued heating of the liner 14 causes the medium 17 contained in the groove 21, which may be a similar or different transpiration medium, to be liquefied and subsequently dispersed throughout the interstices of the liner, whereupon it is forced toward the throat and vaporized at the surface 15 for extending the period during which a cooling of the surface 15 may be effected.

Hence, it is to be understood that the system of the instant invention provides a simple, economic and efficient means for obviating nozzle throat erosion while maintaining structural integrity.

Obviously many modifications and variations of the present invention are possible in the light of the above teachings. If is therefore to be understood that within the scope of the appended claims the invention may be practiced otherwise than as specifically described.

What is claimed is:

1. A system for protecting structural members from the effects of a stream of heated and corrosive gases comprising, in combination:
   a preshaped liner adapted to be positioned between a surface to be protected and a stream of heated gases, whereby at least one surface thereof may be caused to serve as a buffer surface adjacent said stream;
   means defining a plenum chamber arranged in juxtaposed relationship with a given surface of said liner remote from said one surface;
   a predetermined quantity of solid transpiration medium disposed within said chamber in engagement with said given surface;
   means defining within said liner a plurality of uniformly distributed interstices extending between said one surface and said given surface;
   a solid transpiration medium filling said interstices; and
   a fluid conduit connecting said chamber with a source of chamber pressurizing fluid, whereby as said one surface is heated above a predetermined temperature said material is caused to liquefy and be forced by said fluid from said interstices and from said chamber, effused at said one surface and caused to vaporize between said stream of heated gases and said one surface to effect a cooling thereof.

2. The system of claim 1, further characterized in that said liner is formed from a porous, high melting point material, said transpiration medium comprises a low melting point metal, and said fluid comprises an inert gas.

3. The system of claim 1 wherein said predetermined quantity of transpiration medium comprises a solid mass seated in a groove formed in said given surface and disposed within said plenum chamber.

4. The system of claim 3 further characterized in that said liner comprises a matrix structure formed of spherical particles of a first preselected material having a given melting point and said transpiration medium comprises a second preselected material having a boiling point lower than said given melting point.

5. A cooling system for the throat of rocket motor exhaust nozzle for reducing nozzle throat temperature as gases, generated by a burning of rocket propellants within the motor, are exhausted through the nozzle comprising, in combination:
   a matrix formed of a material including communicating interstices and fabricated to conform to a rocket motor annular nozzle throat liner configuration;
   a transpiration material adapted to liquefy and then vaporize at preselected temperatures disposed within the interstices of said matrix;
   means defining an annular pressure cavity concentrically arranged about a portion of said matrix;
   means defining a transpiration material reservoir comprising an external ring-like groove formed in said matrix and opening outwardly into said cavity;
   a ring of solid transpiration medium having predetermined temperatures of liquefication and vaporization disposed within said reservoir;
   means concentrically mounting said matrix within the throat of a given rocket motor exhaust nozzle; and
   a gas conduit including a selectively operable fluid-flow control means extending between said cavity and a source of pressurized gas, whereby as said liner is heated to a preselected temperature by a stream of gases of combustion, the transpiration medium is caused to liquefy and be forced by said gas toward said stream and vaporized at the surface of said throat liner matrix to thereby exert a cooling effect on the surface of said matrix.

6. The system of claim 5 wherein said matrix is formed of porous tungsten and said transpiration material comprises a medium having a boiling point substantially lower than the melting point of tungsten.

7. The system of claim 5 further characterized in that said matrix is formed of a plurality of spherical particles of carbon and said material comprises a solid medium having a boiling point lower than the limiting operating temperature of carbon.

8. The system of claim 5 further characterized in that said matrix is formed of porous carbon.

References Cited by the Examiner

UNITED STATES PATENTS

| | | |
|---|---|---|
| 2,354,151 | 7/1944 | Skoglund. |
| 3,022,190 | 2/1962 | Feldman. |
| 3,069,847 | 12/1962 | Vest. |
| 3,145,529 | 8/1964 | Maloof. |
| 3,153,320 | 10/1964 | Prosser. |
| 3,157,026 | 11/1964 | Lampert _____ 239—127.1 |
| 3,177,658 | 5/1965 | Eastman. |

M. HENSON WOOD, JR., *Primary Examiner.*

V. WILKS, *Assistant Examiner.*